United States Patent Office 2,767,700
Patented Oct. 23, 1956

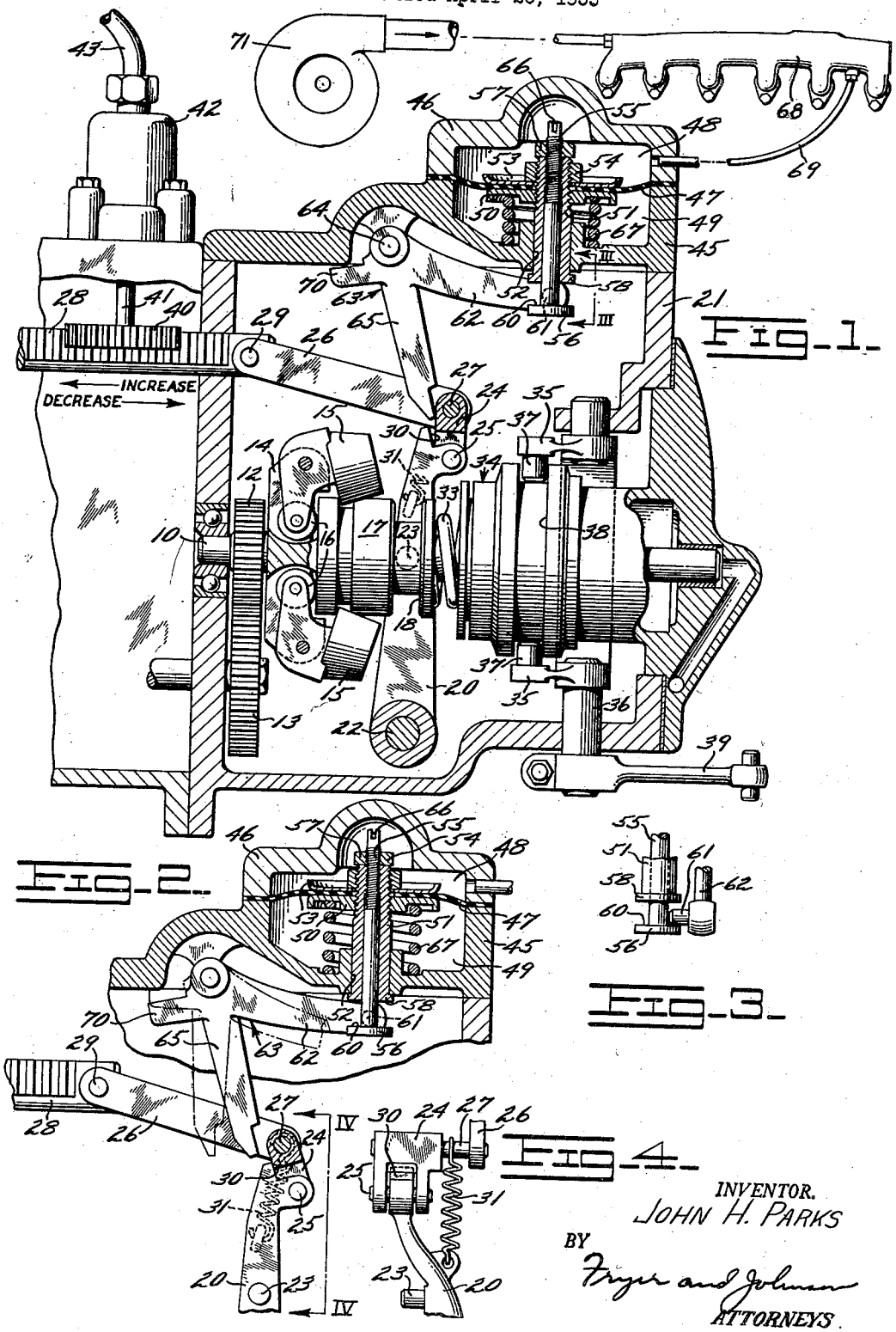

2,767,700
FUEL CONTROL FOR SUPERCHARGED ENGINES

John H. Parks, Peoria, Ill., assignor to Caterpillar Tractor Co., Peoria, Ill., a corporation of California Application April 26, 1955, Serial No. 504,006

3 Claims. (Cl. 123—140)

This invention relates to governors for supercharged internal combustion engines and particularly to a device responsive to engine intake manifold pressure for overriding the governor and limiting the fuel injected into the engine under certain conditions without interfering with the setting or operation of the main engine governor.

Rapid acceleration of many types of supercharged engines results in heavy and objectionable exhaust smoke. This is particularly prevalent during acceleration of engines provided with exhaust driven superchargers wherein the manual governor control can be advanced faster than the engine and supercharger can build up enough speed to provide sufficient air to the combustion spaces of the engine to support complete burning of the fuel being injected therein during a given cycle. This results in large quantities of unburned fuel being expelled from the engine as exhaust smoke.

In addition, engines equipped with superchargers of this type inherently smoke badly under lug. Lug is generally defined as the condition when resistance to movement of the engine or engine load increases until engine speed is decreased from that indicated by the governor setting. Under lug conditions, the engine governor attempts to regain the engine speed indicated by the governor setting by automatically advancing the engine fuel rack to supply more fuel, but due to the reduction in supercharger speed as a result of reduced engine speed insufficient air is supplied to the engine to support complete burning of the additional fuel being injected.

It is the object of the present invention, therefore, to provide a device responsive to inlet manifold pressure which will override the governor and limit the amount of fuel injected into the combustion space under high fuel demand, low speed operating conditions, and permit only that amount of fuel to be injected into the combustion spaces of the engine which can be efficiently burned therein, and thus substantially reduce exhaust smoke under these conditions.

A further object of the present invention is to provide such a limiting device which will not interfere with normal starting of the engine or operation of the governor.

A still further object of the present invention is to provide a pressure responsive fuel limiting device which can be easily adjusted to meet varying fuel and engine output requirements.

Further and more specific objects of the invention are made apparent in the following specification wherein reference is made to the accompanying drawings.

In the drawings:

Fig. 1 is a schematic view in side elevation with parts broken away illustrating the application of the present invention to an internal combustion engine governor with the various parts thereof positioned to limit engine rack movement;

Fig. 2 is a fragmentary view similar to Fig. 1, illustrating the position of the various parts of the device when the engine is shut down;

Fig. 3 is a fragmentary view taken along the line III—III of Fig. 1; and

Fig. 4 is a fragmentary view taken along the line IV—IV of Fig. 2.

In Fig. 1 of the drawings, the principal elements of a diesel engine fuel control mechanism are shown as including a main governor shaft 10 driven by the engine as through gears 12—13 and rotated at a speed comparable to engine speed. A yoke 14 formed as a part of shaft 10 carries pivoted flyweights 15 which tend to swing outwardly when engine speed is increased. Rollers 16 on the flyweights bear against a bearing element 17 having an annular groove 18. A pair of pins 23, one of which is indicated in dotted lines, is carried by a bifurcated lever 20 pivotally supported in governor housing 21 as by a shaft 22, engage annular groove 18 so that as the flyweights swing outwardly, a rocking motion is transmitted to lever 20. The bifurcated end of a link 24 is pivotally secured as by a pin 25 to the upper end of lever 20. The opposite end of link 24 is pivotally secured to a link 26 as indicated at 27 which, in turn, is pivotally secured to a fuel control or rack bar 28 as by a pin 29. Link 24 is normally urged into engagement with a stop 30 on the lever 20 by a spring 31 which maintains the link in the generally angular position disclosed in Fig. 2 during normal operation of the governor. This spring tension may be overcome by sufficient pressure applied to the upper end of link 24 in opposition to the control of the governor as disclosed in my assignee's United States Patent No. 2,645,474 issued to Randolph C. Barnes on July 14, 1953, and entitled "Safety Control for Engine Governors."

A main governor spring shown at 33 is disposed between a manually actuated servomotor 34 and bearing member 17. The construction and operation of this type of governor is completely described in my assignee's United States Patent No. 2,648,533, issued to Carl R. Maxwell et al. on August 11, 1953, and entitled "Centrifugal Governor Having Hydraulically Assisted Speed Setting Control." As is best shown in Fig. 1, the position of servomotor 34 and hence the preload on governor spring 33 is controlled by a yoke comprising a pair of levers 35 nonrotatably secured to a shaft 36 supported in housing 21. A pin 37 extending inwardly from each of levers 35 engages an annular groove 38 formed in the outer slidable member of servomotor 34. A lever 39 nonrotatably secured to shaft 36 is connected by conventional linkage, not shown, to a manually actuated governor lever or foot pedal, not shown.

Upon the tendency of the governor flyweights to spread outwardly due to engine speed in excess of that indicated by the preload on spring 33, the lever 20, through links 24 and 26, is effective to move rack bar 28 toward the right to rotate gears, one of which is shown at 40, fixed to plungers 41 on the fuel pumps, one of which is indicated at 42 to reduce the fuel supplied to the engine. There is generally one such fuel pump for each combustion cylinder of the engine, although in the present illustration only one is shown. The fuel pump plungers are reciprocated through conventional mechanism to inject fuel in measured quantities to the combustion spaces through conduits such as indicated at 43 and the plungers are so designed that the quantities of fuel metered may be adjusted by their partial rotation as is accomplished when the rack bar moves and rotates the gears 40.

As engine speed at given governor spring preload decreases under lug conditions, flyweights 15 rock inwardly and lever 20 tends to rock in a counterclockwise direction to rotate gears 40 and increase the fuel injected into the combustion spaces during each cycle. The corresponding reduction in the speed of the supercharger reduces the quantity of air supplied to the engine and there is insufficient air introduced into the combustion spaces to support complete burning of the increased fuel injected with the result that there is excessive exhaust smoke due to the discharge of unburned particles of fuel.

In accordance with the present invention, this excessive exhaust smoke under lug is prevented by providing a two-part housing 45—46 secured to the top of governor housing 21 as by capscrews, not shown. A diaphragm 47 supported between lower portion 45 and upper portion 46 of the housing divides said housing into a pressure chamber 48 and a spring chamber 49. This diaphragm assembly comprises a recessed thrust plate 50 underlying the diaphragm and threaded on a sleeve 51 slidably mounted in a bore 52 formed in housing member 45. A deformed washer 53 and a nut 54 overlying the diaphragm are likewise threaded onto the upper end of sleeve 51. A rod 55 having a flange 56 at the lower end thereof extends through and is threaded to the interior of sleeve 51. A lock nut 57 insures proper spacing between the flange 56 and a flange 58 formed at the lower end of sleeve 51. The flanges define an annular groove 60 to receive a pin 61 carried by an arm 62 of a bellcrank 63 pivotally supported in housing member 45 as indicated at 64. The other arm 65 of bellcrank 63 extends downwardly toward link 24.

Diaphragm 47 is normally urged upwardly by a spring 67 disposed between housing member 45 and plate 50. Upward movement of the diaphragm and spring is limited by the abutment of flange 58 against the lower side of housing member 45 as shown in Fig. 2. When the engine is shut down, bellcrank 63 assumes a position where pin 61 contacts flange 56, as shown in Fig. 2. The upper end of rod 55 is provided with a slot 66 to receive a tool by which it may be rotated to adjust the height of flange 56 and thereby permit adjustment of arm 65 with respect to link 24 to enable sufficient rack bar movement to start the engine.

Pressure chamber 48 communicates with and is maintained at the same pressure as inlet manifold 68 through the provision of a conduit 69. Thus, when the engine is started and brought up to normal load, sufficient pressure is supplied to the inlet manifold by the supercharger to urge diaphragm 47 and hence sleeve 51 downwardly to rock bellcrank 63 in a clockwise direction to the phantom line position shown in Fig. 2 so that the bellcrank is maintained out of contact with link 24 throughout the entire range of travel of lever 20 under normal operating conditions, and the preload on governor spring 33 may be further adjusted to the desired engine speed setting.

A supercharger, shown at 71 in Fig. 1, is connected to the manifold 68 in the usual manner and under lug conditions, intake manifold pressure is reduced as a result of decreased supercharger speed. Pressure in chamber 48 is decreased and spring 67 urges diaphragm 47 and hence sleeve 51 and rod 55 upwardly, and bellcrank 63 is rocked in a counterclockwise direction toward link 24 until the pressure in chamber 48 is balanced by the load on spring 67. As previously described, counterweights 15 tend to rock inwardly as a result of reduced engine speed under lug to move rack bar 28 to the left and increase the quantity of fuel supplied to the engine per cycle, but movement of the rack bar beyond the point where there will be insufficient combustion air to support complete burning of the fuel is prevented by the abutment of link 24 against arm 65. The resiliency of spring 31 permits the link 24 to swing or break about the pivotal connection 25 so that normal movement of the governor is unimpeded but no more fuel can be injected into the combustion spaces of the engine than can be completely burned. As the engine recovers speed upon continued operation, bellcrank 63 is progressively rocked in a clockwise direction as pressure builds up in compartment 48 until normal engine operation is resumed. Furthermore, due to the threaded engagement of sleeve 51 with plate 50, washer 53 and nut 54, the preload on spring 67 can be varied to adjust the position of arm 64 for a given inlet manifold pressure.

Similarly, when lever 39 is actuated to advance the engine rack bar faster than the engine and supercharger can build up speed to supply the desired fuel-air ratio for complete burning of the fuel, leftward movement of link 24 is restrained at a point dictated by pressure in chamber 48 and link 24 swings or breaks about pivotal connection 25 to limit fuel supply to the engine until sufficient pressure is built up in the chamber to rock bellcrank 63 in a clockwise direction and permit the link to return to the position disclosed in Fig. 2 at which point normal governor operation is resumed. Furthermore, the point of restraint of rack movement for a given inlet manifold pressure can be adjusted by backing off lock nut 57 and rotating rod 55 to adjust the height of flange 56 with respect to diaphragm 47.

A stop 70 is provided on bellcrank 63 so that under certain operating conditions of high speed and high inlet manifold pressure, the stop engages housing 45 and arm 65 is prevented from interfering with the normal operation of the governor. This stop has the added purpose of limiting clockwise rotation of bellcrank 63 when adjustments or repairs are being made to the pressure responsive unit so that accidental disengagement of pin 61 from annular groove 60 is prevented.

I claim:

1. In an internal combustion engine, the combination of a governor, a movable member associated with the governor to control fuel supply, an engine driven supercharger for supplying combustion air to the engine intake manifold and means responsive to inlet manifold pressure to maintain a fuel-air ratio which will support complete burning of the fuel injected per cycle, said means including a pressure responsive unit associated with the inlet manifold and a movable stop associated with said pressure responsive unit and contactable by said movable member.

2. In an internal combustion engine, the combination of a governor, a movable member associated with the governor to control fuel supply, an engine driven supercharger for supplying combustion air to the engine intake manifold and means responsive to intake manifold pressure for overriding said governor and limiting movement of said movable member under high fuel demand, low speed conditions, said means including a housing with connections to the inlet manifold, a diaphragm disposed within said housing and normally urged in one direction by a spring and in the opposite direction by intake manifold pressure, a movable stop associated with said diaphragm whereby a reduction in manifold pressure is effective to move said stop toward said movable member.

3. In an internal combustion engine, the combination of a governor, a movable member associated with the governor to control fuel supply, an engine driven supercharger for supplying combustion air to the engine intake manifold and means responsive to intake manifold pressure for overriding said governor and limiting movement of said movable member under high fuel demand, low speed conditions, said means including a housing with connections to the inlet manifold, a diaphragm disposed within said housing and normally urged in one direction by a spring and in the opposite direction by intake manifold pressure, a movable stop associated with said diaphragm whereby a reduction in manifold pressure is effective to move said stop toward said movable member and means for adjusting the position of said stop relative to said diaphragm.

References Cited in the file of this patent

UNITED STATES PATENTS 2,179,628    Heinzelmann  ----------  Nov. 14, 1939

OTHER REFERENCES

Serial No. 314,190, Hurst (A. P. C.), published May 11, 1943.